(12) United States Patent
Holthe

(10) Patent No.: US 9,038,270 B2
(45) Date of Patent: May 26, 2015

(54) METHOD FOR THE PRODUCTION OF A TUBULAR BODY, AND CONTROL ARM PRODUCED BY THIS METHOD

(71) Applicant: Benteler Automobiltechnik GmbH, Paderborn (DE)

(72) Inventor: Ragnar Holthe, Raufoss (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 215 days.

(21) Appl. No.: 13/648,046

(22) Filed: Oct. 9, 2012

(65) Prior Publication Data

US 2013/0269476 A1 Oct. 17, 2013

(30) Foreign Application Priority Data

Oct. 10, 2011 (DE) .......................... 10 2011 054 343

(51) Int. Cl.
| | | |
|---|---|---|
| B21D 22/00 | (2006.01) | |
| B29D 23/00 | (2006.01) | |
| B21C 23/18 | (2006.01) | |
| B21K 1/76 | (2006.01) | |
| B21K 21/08 | (2006.01) | |

(52) U.S. Cl.
CPC ............ *B29D 23/00* (2013.01); *Y10T 74/2142* (2013.01); *B21C 23/183* (2013.01); *B21K 1/763* (2013.01); *B21K 21/08* (2013.01)

(58) Field of Classification Search
USPC ........... 29/893.34, 897.2; 72/265, 349, 379.4, 72/260, 467, 272, 264, 283, 77, 343
See application file for complete search history.

(56) References Cited

U.S. PATENT DOCUMENTS

| | | | | |
|---|---|---|---|---|
| 2,687,997 A | * | 8/1954 | Marchand ................ | 210/321.78 |
| 2,819,794 A | * | 1/1958 | Krause ............... | 72/260 |
| 2,903,130 A | * | 9/1959 | Reichl .............. | 72/260 |
| 2,932,889 A | * | 4/1960 | Kritscher .................. | 72/342.94 |
| 3,165,199 A | * | 1/1965 | Tlaker .............. | 72/343 |
| 3,176,494 A | | 4/1965 | Cullen et al. | |
| 3,422,648 A | * | 1/1969 | Lemelson ...................... | 72/17.2 |
| 3,564,894 A | * | 2/1971 | Sharon ............. | 72/344 |
| 3,837,205 A | * | 9/1974 | Simon ............. | 72/260 |
| 3,893,326 A | * | 7/1975 | Oberlander et al. ............ | 72/347 |
| RE28,600 E | * | 11/1975 | Lemelson ....................... | 72/265 |
| 3,999,415 A | * | 12/1976 | Austen ............... | 72/56 |
| 4,462,234 A | * | 7/1984 | Fiorentino et al. ................ | 72/41 |
| 4,509,353 A | * | 4/1985 | Ike et al. ......................... | 72/267 |
| 4,653,305 A | * | 3/1987 | Kanamaru et al. ............... | 72/343 |
| 4,785,648 A | * | 11/1988 | Budrean et al. .................... | 72/77 |
| 4,805,435 A | * | 2/1989 | Sukimoto et al. ............... | 72/283 |
| 5,557,962 A | * | 9/1996 | Takikawa ....................... | 72/260 |

(Continued)

FOREIGN PATENT DOCUMENTS

| | | |
|---|---|---|
| DE | 102 41 406 A1 | 12/2003 |
| DE | 600 20 508 T2 | 5/2006 |
| DE | 600 29 124 T2 | 5/2007 |

*Primary Examiner* — Richard Chang
(74) *Attorney, Agent, or Firm* — Henry M. Feiereisen LLC

(57) ABSTRACT

In a method of making a tubular body, material is pressed through a die of a forming tool into a first mold cavity disposed in downstream relationship to the die to produce a first end piece. A mandrel is then moved in a direction of the die to thereby displace the mold cavity in the same direction and to extrude a tubular center piece to adjoin the first end piece. The mandrel is then replaced by a mold having a second mold cavity to mold a second end piece to adjoin the center piece.

12 Claims, 3 Drawing Sheets

(56) References Cited

U.S. PATENT DOCUMENTS

| | | | |
|---|---|---|---|
| 5,964,120 A * | 10/1999 | Iwase et al. | 72/467 |
| 6,470,726 B1 * | 10/2002 | Murata et al. | 72/260 |
| 6,810,586 B1 | 11/2004 | Waaler et al. | |
| 8,413,478 B2 * | 4/2013 | Tomaru et al. | 72/349 |

* cited by examiner

METHOD FOR THE PRODUCTION OF A TUBULAR BODY, AND CONTROL ARM PRODUCED BY THIS METHOD

CROSS-REFERENCES TO RELATED APPLICATIONS

This application claims the priority of German Patent Application, Serial No. 10 2011 054 343.0, filed Oct. 10, 2011, pursuant to 35 U.S.C. 119(a)-(d), the content of which is incorporated herein by reference in its entirety as if fully set forth herein.

BACKGROUND OF THE INVENTION

The present invention relates to a method for the production of a tubular body, and to a control arm produced by this method.

The following discussion of related art is provided to assist the reader in understanding the advantages of the invention, and is not to be construed as an admission that this related art is prior art to this invention.

U.S. Pat. No. 6,810,586, issued on Nov. 2, 2004 to Waaler et al., discloses a control arm for use in the wheel suspension of a car. The arm is produced from a hollow, closed profile of high strength, extruded aluminium. The arm is produced in a wholly cold process, similar to the one used to produce aluminium fenders, involving stretch-bending, pressing, cutting and punching of the aluminium profile into the desired shape.

U.S. Pat. No. 6,470,726, issued on Oct. 29, 2002 to Murata et al., discloses an extruded article which has at least one hollow portion and changes in cross-section along a direction of an extrusion axis is manufactured by the method. The method includes the step of advancing a punch to extrude a billet while controlling a movement of a mandrel for defining an inner periphery of the hollow portion relative to a die for defining an outer periphery of the extruded article.

The manufacture of such control arms requires the implementation of several operating steps. In particular the connection zones have to be made by a separate step. As a result, cycle times for the production are prolonged and different tools and machines are required. Moreover, the required production space is increased as a result of the need for a multiplicity of tools and machines.

It would therefore be desirable and advantageous to address this problem and to obviate other prior art shortcomings.

SUMMARY OF THE INVENTION

According to one aspect of the present invention, a method of making a tubular body includes pressing a material through a die of a forming tool into a first mold cavity disposed in downstream relationship to the die to produce a first end piece, moving a mandrel in a direction of the die to displace the mold cavity in the same direction and to thereby extrude a tubular center piece adjoining the first end piece, and replacing the mandrel by a mold having a second mold cavity to mold a second end piece adjoining the center piece.

According to another advantageous feature of the present invention, the material being formed can be heated to a forming temperature in the range from 450° C. to 550° C. Examples of suitable material to be hot formed include an aluminum material, a magnesium material, or a plastic, such as a fiber-reinforced plastic, e.g. with so-called "chopped fibers". When the material is made predominantly of aluminum or aluminum alloy, wrought alloy according to DIN EN 573-3 and DIN EN 573-4 under the code 6XXX and 7XXX can be involved here. The wrought alloys of the group 6XXX can be subjected to heat treatment and have a strength from 120 to 400 N/mm$^2$ and may involve aluminum/magnesium-silicon alloys with a silicon proportion and a magnesium proportion of about 1%. Alloys having the code 7XXX involve heat treatable wrought aluminum alloys with a strength between 220 to 600 N/mm$^2$. These types of alloys contain zinc (Zn) in the range of 0.8% weight-% to 12 weight-%.

In accordance with the present invention, the material is advantageously heated when formed in the forming tool. When aluminum is involved, the material can be heated to a forming temperature from 450° C. to 550° C. before the material is being introduced into the forming tool. Aluminum alloys with the code 6XXX can be heated to a temperature in a range from 520° C. to 540° C., whereas aluminum alloys with the code 7XXX can be heated to a temperature of about 480° C. It is, of course, also conceivable to implement the heating process, e.g. inductively, within the forming tool which may be heated in its entirety or also in part during the forming process. Advantageously, the forming tool is at least heated in the region of the mold cavities in which the forming process is executed.

After the material has been introduced in the forming tool, the first end piece is formed in the first mold cavity of the forming tool which has been filled with material to enable a formation of the contour of the first end piece. The material is hereby forced through a die of the forming tool.

After molding the first end piece, which may involve, e.g. a flange, mounting eye, or also a forked structure, a tubular center piece is formed using extrusion. For that purpose, the first mold cavity with the first end piece is moved away from the die. Material being pressed through an annular space of the die forms the tubular center piece which adjoins the first end piece in one piece. The extrusion process involved here is a forward extrusion process. The extrusion process may be assisted by drawing the tubular center piece being formed when the end piece is not only guided but also serves to transmit tensile forces.

To prevent the presence of a pressure below atmospheric within the tubular center piece, the mandrel has a small air feed opening to provide a required pressure balance between the interior space of the tubular center piece and the surroundings.

After extruding the center piece, the mandrel is removed and replaced by a mold with a second mold cavity provided to receive material for molding a second end piece. The second mold cavity can have any desired configuration. Possible geometries of the second end piece that can be formed in this mold cavity include flanges, mounting eyes or forked structures. When mounting eyes or forked structures are involved, the presence of at least one movable mandrel within the second mold cavity may be conceivable about which material may flow for shaping the second end piece so that respective openings, e.g. mounting eyes, can be formed in the second mold cavity.

An important aspect of a method according to the present invention is the capability to remove the produced tubular body from the forming tool. Therefore, the forming tool involves a multipart tool having at least a top mold and a bottom mold. The provision of a two-part tool is also required in order to allow a removal of the die which is provided to form the tubular center piece during the manufacturing process.

When the second end piece is formed, the change from the mandrel to the second mold cavity may be realized using a turntable. Additional mandrels may be arranged on the turntable, for example when forming of the first end piece involves a mandrel with a geometry that deviates from the geometry of the mandrel for forming the tubular center piece.

The formation of the second end piece may include additional material being forced into the second mold cavity. The additional material may be heated to a temperature from 450° C. to 550° C., when the material is aluminum, and pressed into the second mold cavity. The additional material bonds with the material already present in the second mold cavity for formation of the second end piece.

According to another advantageous feature of the present invention, the mandrel for forming the center piece has a diameter which may vary in a longitudinal direction so as to vary a width of an annular gap between the die and the mandrel as a function of a position of the mandrel in relation to the die. As a result, more or less material is forced through the die depending on the width of the annular gap so that the wall thickness of the tubular center piece can be varied. In this way, it is possible to configure the tubular center piece with at least two different wall thicknesses which can be selected to best suit the stiffness of the tubular body to the situation at hand.

Apart from a circular cross section, the tubular center piece of the body may also be configured to have polygonal or non-circular profiles. For example, the cross section of the tubular center piece may be triangular, tetragonal or generally polygonal, oval, or ellipsoid.

A method according to the present invention allows the formation of end pieces of almost any configuration and combines three forming steps, without necessitating a removal of the workpiece from the forming tool. As a result, cycle times for the production of the tubular body can be reduced and production processes can be significantly expedited. In particular, the end pieces can be molded onto the tubular center piece much quicker than in situations that require multiple transfers into different tools.

The entire tubular body can be produced in one production step and in a single forming tool. There is no need for further operating steps, such as cutting, perforating, or attachment of other components, although, for example, a control arm as tubular body may have to undergo further production steps outside the forming tool, e.g. machining to produce holes or attachment surfaces. Also welding of the tubular body with further components may be implemented.

According to another aspect of the present invention, a control arm for an undercarriage includes a first end piece, a tubular center piece formed on one end of the first end piece through extrusion, and a second end piece formed in one piece and of same material on the center piece at an end distal to the first end piece.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
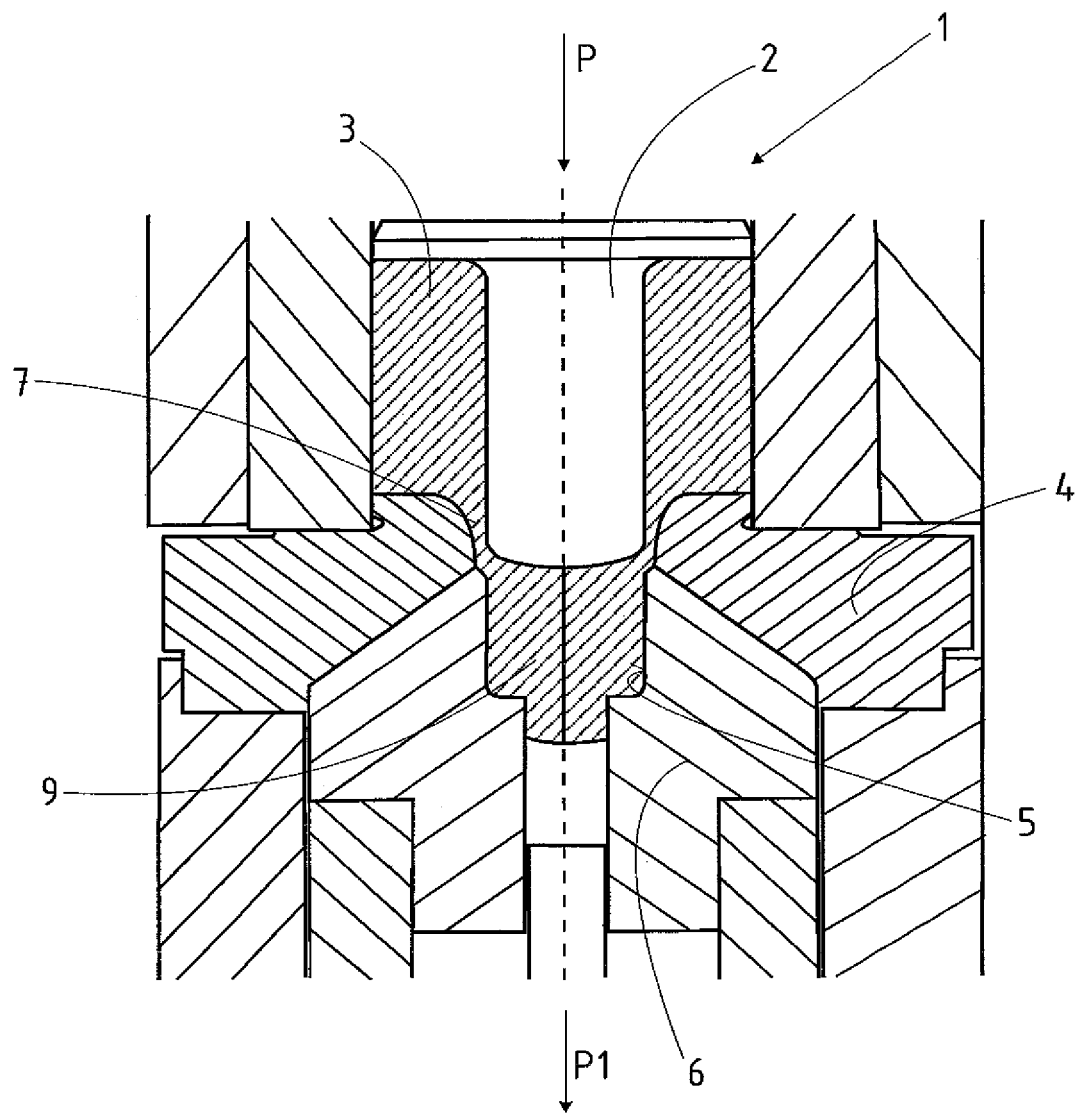
FIG. 1 is a sectional view of a forming tool for carrying out a method according to the present invention, depicting the formation of an end piece.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a forming tool, generally designated by reference numeral 1 for the production of a tubular body. The forming tool 1 is filled with material 3 which is to be shaped and shown here by way of cross hatching and which may be made of an aluminum material. The material 3 is heated to a forming temperature in a range from 450° C. to 550° C. The material 3 can be heated before being introduced into the forming tool 1. Although not shown in detail, the forming tool 1 includes a heater, e.g. inductive heater, to heat the forming tool 1 to a temperature above 400° C.

The forming tool 1 includes a mandrel 2 which is movable in a direction of arrow P. The mandrel 2 serves to push material 3 downwards in the drawing plane through a die 4. Adjoining the die 4 is a first mold cavity 5 which is already filled with material 3. The mold cavity 5 is part of a mold 6 which is movable in a direction of arrow P1. The mold 6 moves downwards, when the mold cavity 5 is filled. As the mandrel 2 advances further downwards in the direction of arrow P, the mandrel 2 and the die 4 form an annular space 7 through which material 3 is pressed to thereby form a tubular center piece 10, as will now be described with reference to FIGS. 2 to 4 which show sectional detailed views of part of a modification of the forming tool 1, depicting various operating positions of the mandrel 2 and the die 4.

Figure 4:
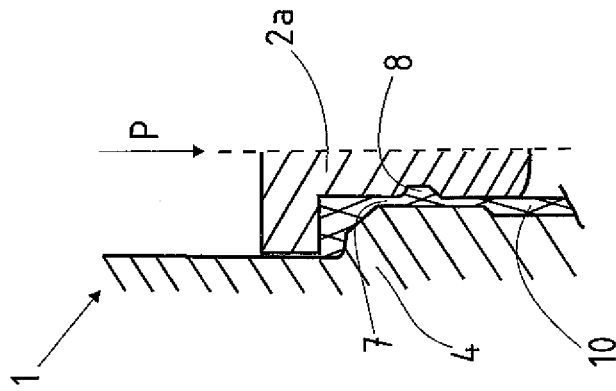
FIGS. 2 to 4 are sectional detailed views of part of a modification of the forming tool for carrying out a method according to the present invention, depicting various operating positions of a mandrel and a die of the forming tool during extrusion of a tubular center piece.
Figure 3:
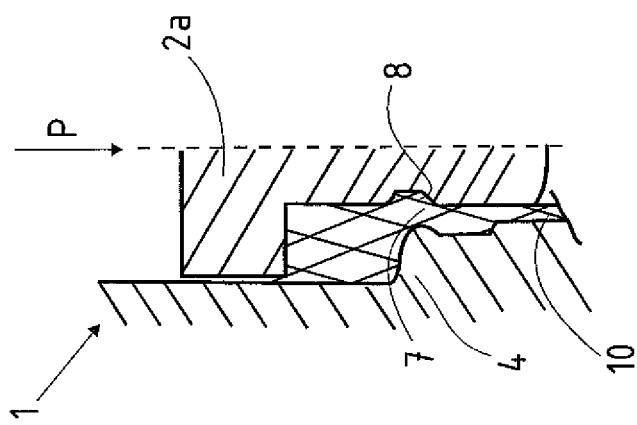
Figure 2:
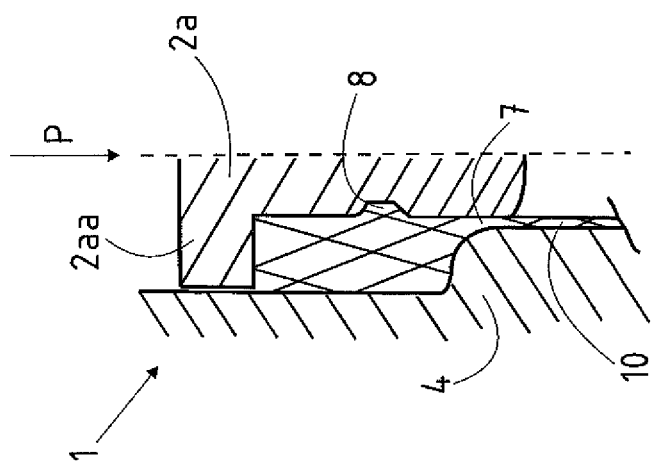

In the embodiment of FIGS. 2 to 4, the forming tool 1 has a mandrel 2a which has a diameter that varies in longitudinal direction. Approximately in midsection of its length, the mandrel 2a has a recess 8. As the mandrel 2a including its mandrel shoulder 2aa and recess 8 are rotation-symmetric, FIGS. 2 to 4 show only one half of the mandrel 2a or forming tool 1.

As the mandrel 2a is moved in the direction of arrow P (cf. FIG. 2), a tubular portion is formed which adjoins in one piece the first end piece 1, formed in a manner shown in FIG. 1. The tubular portion represents a tubular center piece 10 of the finished tubular body, when a second end piece 11 is formed, as will be described hereinafter with reference to FIG. 5.

When the mandrel 2a continues to move in the direction of arrow P, as shown in FIG. 3, the recess 8 passes by the die 4. As a result, the annular gap 7 between the mandrel 2a and the die 4 increases so that more material 3 is able to flow through the annular gap 7. This causes an increase in the wall thickness of the tubular center piece 10. The flow of material 3 causes an increase of the wall thickness in an outer region but not in the inner region of the center piece 10.

FIG. 4 shows the state when the recess 8 has passed the die 4 and the annular gap 7 is smaller again. In this case, the wall thickness of the center piece 10 decreases. Material 3 flows past the recess 8 so as to enable the mandrel 2a to retract again without interference from the recess 8 of the mandrel 2a. This is effected because the recess 8 has already moved past the die 4 in the end position shown in FIG. 4, so that the undercut formed by the recess 8 is not filled with material 3.

Figure 5:
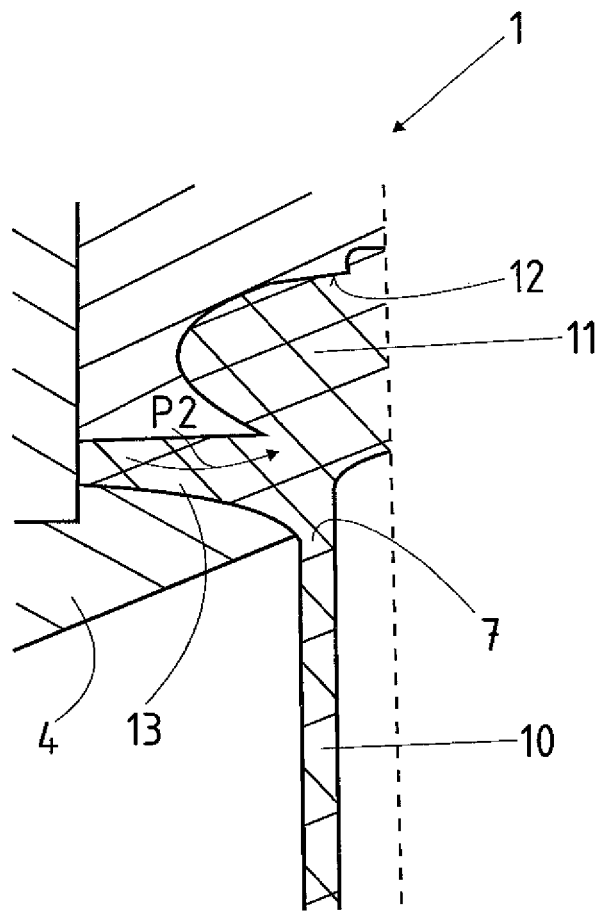
FIG. 5 is a sectional detailed view of part of the forming tool, depicting a mold for producing a further end piece.

After the tubular center piece 10 has been formed together with the first end piece 9 in one and the same forming tool 1, a third production step is executed to form a second end piece 11. As shown in FIG. 5, the end piece 11 is configured in the non-limiting example substantially as a thickening which adjoins the tubular center piece 10. The formation of the thickened end piece 11 involves a replacement of the mandrel 2a with a mold 6 having a second mold cavity 12. When the mold cavity 12 is closed, material 3 is displaced in the drawing plane from a lower region to an upper region of the mold cavity 12 as a result of material 3 being forced from a collar region 13 of the mold cavity 12 in the direction of arrow P2 to the upper region of the mold cavity 12 until the mold cavity 12 is filled. Optionally, additional material may be introduced into the mold cavity 12 and is heated beforehand. For example, when the additional material is aluminum material, it is heated to a temperature from 450° C. to 550° C. Currently preferred is inductive heating.

The forming tool 1 can then be opened and the thus-produced tubular body can be removed. A single forming tool 1 is thus sufficient to produce a tubular body with terminal end pieces 9, 11. There is no need for expendable molds. The tubular center piece 10 in combination with material aluminum results in a very lightweight and rigid construction of the produced tubular body which may then undergo further shaping operations, such as, e.g., machining of functional surfaces. A method according to the present invention is especially suitable for the production of structures useful for undercarriages of a motor vehicle, in particular control arms for an undercarriage. The control arm has a single-piece configuration having a tubular center piece produced through extrusion and adjoined on opposite ends by end pieces.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making a tubular body, comprising:
pressing a material through a die of a forming tool into a first mold cavity disposed in downstream relationship to the die to produce a first end piece;
moving a mandrel in a direction of the die to displace the mold cavity in the same direction and to thereby extrude a tubular center piece adjoining the first end piece; and
replacing the mandrel by a mold having a second mold cavity to mold a second end piece adjoining the center piece.

2. The method of claim 1, wherein the material includes predominantly aluminum, and further comprising heating the material to a forming temperature in the range from 450° C. to 550° C.

3. The method of claim 2, wherein the material is heated in the forming tool to the forming temperature.

4. The method of claim 2, wherein the material is heated to the forming temperature before being introduced into the forming tool.

5. The method of claim 1, further comprising heating the forming tool, at least in an area thereof, to a temperature in the range from 400° C. to 540° C.

6. The method of claim 1, wherein the material is a magnesium material.

7. The method of claim 1, wherein the material is a plastic.

8. The method of claim 7, wherein the plastic is a fiber-reinforced plastic.

9. The method of claim 1, further comprising pressing additional material into the second mold cavity for molding the second end piece.

10. The method of claim 1, wherein the mandrel has a diameter which varies in a longitudinal direction so as to vary a width of an annular gap between the die and the mandrel as a function of a position of the mandrel in relation to the die.

11. The method of claim 1, further comprising molding in the second mold cavity at least one opening in the second end piece by moving at least one mandrel in the second mold cavity.

12. The method of claim 1, further comprising balancing a pressure between an interior of the tubular center piece and the surroundings by providing the mandrel with an air opening.

* * * * *